United States Patent [19]

Wigoda

[11] Patent Number: 4,655,026
[45] Date of Patent: Apr. 7, 1987

[54] PILL DISPENSING MACHINE

[76] Inventor: Luis T. Wigoda, 345 N. Shore Dr., Miami Beach, Fla. 33141

[21] Appl. No.: 807,754

[22] Filed: Dec. 11, 1985

[51] Int. Cl.$^4$ .................. B65B 5/12; B65B 59/02; B65B 61/26
[52] U.S. Cl. ........................................... 53/55; 53/64; 53/131; 53/137; 53/238; 53/246; 364/479
[58] Field of Search ..................... 53/55, 64, 137, 131, 53/238, 240, 246, 250; 364/479

[56] References Cited

U.S. PATENT DOCUMENTS

| | | | |
|---|---|---|---|
| Re. 27,405 | 6/1972 | Ehe et al. | 53/328 X |
| 3,490,197 | 1/1970 | Cremieux | 53/55 |
| 4,360,125 | 11/1982 | Martindale et al. | 364/479 X |
| 4,543,766 | 10/1985 | Boshinski | 53/64 |
| 4,554,955 | 11/1985 | Von Lersner et al. | 364/479 X |
| 4,572,403 | 2/1986 | Benaroya | 364/479 X |
| 4,583,345 | 4/1986 | Hirosaki et al. | 53/137 X |

Primary Examiner—Horace M. Culver

Attorney, Agent, or Firm—Harry W. Barron

[57] ABSTRACT

Disclosed herein is a pill dispensing machine which can selectively dispense a plurality of different medications into preformed recesses in a plastic strip. The machine includes data entry means for entering the various types of medications to be dispensed and the time and date at which such medications are to be administered to the patient. The machine controls a plurality of dispensing devices to dispense into each of the recesses one or more pills associated with a particular time and date for administration. The machine also includes printing means for printing the date and time of administration onto a backing label adapted to cover the recesses to form a wholly contained pill container. The machine also includes a conveyor mechanism for moving the plastic strips past the dispensing means and the label applying area so that, at the output of the machine, completed packages of pills ready for administration at the specified printed time can be given to the patient.

20 Claims, 9 Drawing Figures

Fig. 6.

```
139)
    140)
    Today   Date    : XX/YY/ZZ
    [Name]   141
    Address          :
    City/State/Zip   :
    Phone            :
    Doctor           :
    Autocall (Y/N)   :
    Start Date       :
    Start Time       :
    Rx Number 1      :
    Medicine #1 Name :
    Medicine #1 Time(s):
    Rx Number 2      :
    Medicine #2 Name :
    Medicine #2 Time(s):
    Rx Number 3      :
    Medicine #3 Name :
    Medicine #3 Time(s):
    Rx Number 4      :
    Medicine #4 Name :
    Medicine #4 Time(s):
```

| Addr. | Data | 144) |
|---|---|---|
| 0(0) | First Container, First Compartment | |
| 1(3) | First Container, Second Compartment | |
| 2(6) | First Container, Third Compartment | |
| 3(9) | First Container, Fourth Compartment | |
| 4(12) | Second Container, First Compartment | |
| 5(15) | Second Container, Second Compartment | |
| 6(18) | Second Container, Third Compartment | |
| 7(21) | Second Container, Fourth Compartment | |
| 8(24) | Third Container, First Compartment | |
| 9(27) | Third Container, Second Compartment | |
| 10(30) | Third Container, Third Compartment | |
| 11(33) | Third Container, Fourth Compartment | |
| 12(36) | Fourth Container, First Compartment | |

| Breakfast | Lunch | Dinner | Bed | Not Used | Not Used | Not Used | Not Used |
|---|---|---|---|---|---|---|---|
| 0 | 1 | 0 | 0 | X | X | X | X |

~146

0 = Off
1 = On
X = Don't Care

Fig. 8.

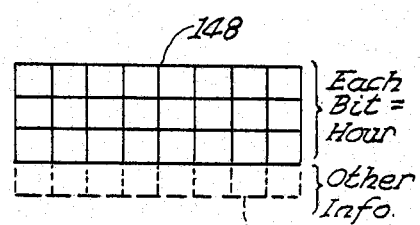

148

} Each Bit = Hour

} Other Info.

PILL DISPENSING MACHINE

This invention relates to a pill dispensing machine, and more particularly, to such machine in which a plurality of different prescriptions can be placed in a common container in such a fashion that each of the pills within a given container are to be taken simultaneously at a particular time of the day.

Many people with illness are required to take several medications. This is particularly true of older people who may have many different medical problems requiring many different medications. Each of the medications are given in different dosages such that, for example, some medications may be taken four times a day, other medications once a day and still other medications every other day.

As people increase in years, their memories may not be as good as they once were. While these type of people typically may remember that they must take their medicine, they may become confused about which pill they are to take at which time. It would be better to have a package, specifying the date and time the pills are to be taken, containing all of the pills for each individual time. Such a prepackaged group of medications would relieve the patient from having to remember which pill is to be taken at which particular time.

Prepackaging a series of pills in an individual package is done at the present time in a manual manner. Typically, such prepackaging is done in a hospital pharmacy for a patient in the hospital who is required to take several different pills at different intervals. The hospital pharmacist will take the individual pills from the storage containers and place them in individual packages with the patient's name and time for administration written on the package. Each package may contain one or more pills depending on the time of the day and the various prescriptions for that patient. For example, if a patient has four prescriptions, two of which require a pill four times a day, one of which requires a pill twice a day, and the fourth of which requires a pill every other day, the individual packages prepared may contain anywhere from one to four pills, depending on the time of day or day itself.

Needless to say, the manual procedure described above is both time consuming, and hence expensive, as well as extremely prone to human error. It would be very easy for a busy pharmacist to put an incorrect pill in a particular package. Each of the packages, typically small envelopes, are not connected together in any particular manner. The pharmacist must label each package with the patient's name, or other identification, and then fill each package. The pharmacist, of course, is performing this task for many different patients during the day. Then, the packages are all sent to the various nurses stations throughout the hospital for administration to the patients at the prescribed time. By the time the packages are labeled, filled, and transferred to the nurses, station, there are many chances for an error to occur. For example, it would be easy for a nurse to pick the wrong package from the delivered group of packages on her desk and give the patient the wrong medication or at least medication at the wrong times. Also, the paper envelope packages can become undone and medication can fall out, or a mistake can be made in labeling the packages.

It is well known in the art that pills can be prepackaged by mechanical devices in preformed plastic packages. For example, U.S. Pat. No. 2,828,888, in the name of C. Nicolle, shows a machine for packaging the pills in a preformed plastic strip having small pill containing recesses been formed therein. After the pill is dispensed in the recess and a backing is placed on the strip covering the recesses, the pills are wholly contained within each of the recesses and may be removed by pressure being applied on the plastic outside of the recess. This pressure forces the pill through the backing paper, allowing the pills to be easily removed and taken by the patient. Other types of automatic pill packaging devices are shown in, for example, U.S. Pat. No. 3,139,713, in the name of L. H. Merrill et al, which discloses a machine for filling bottles with a preselected number of pills. A similar type device is shown in U.S. Pat. No. 3,3354.607, in the name of E. E. Lakso. It is also well known from the prior art to be able to package pills in individual containers in the so called dial pack type container. In this type container, a plurality of pills, for example 21, may be packaged in a single container in which one pill a day may be removed. An example of such a device is shown in U.S. Pat. No. 3,530,639, in the name of C. F. Bross.

The problem with the machines of the prior art, as indicated by the above mentioned U.S. Patents, is that they are only capable of packaging one type of pill in a given package. Even to the extent that the prior art machines could be used to package more than one pill in the same package by passing the same package across the dispensing mechanism of the devices more than one time, it would be still impossible to selectively dispense pills pursuant to a physician's prescription, such that some packages contain one group of pills and other packages contain a different group of pills.

In accordance with one aspect of this invention, there is provided a medication dispensing machine for dispensing into a single container, a plurality of different medications to be simultaneously taken. The machine comprises means for moving a plurality of containers along a path and a plurality of medications dispensing devices, each positioned to dispense at least one medication into a container as the plurality of containers move past the plurality of dispensing devices. In addition, the machine includes printing means for printing a series of labels, each of which is to be attached to one associated container. The printed matter on each label manifests a time at which the medication in that associated container is to be taken. Further the machine includes controller means, including data input means, memory means for storing a data base and data output means, the data input means adapted for receiving input data manifesting which medication is to be taken and the time at which such medication is to be taken, and the output means providing, in response to the data base, a command signal to control the means for moving, the dispensing devices and the printing means.

One preferred embodiment of the subject invention is hereafter described, with specific reference being made to the following Figures, in which:

FIG. 6 shows the display screen prompting the required input information for the computer system shown in FIG. 4;

FIG. 7 shows the organization of the data base used by the computer system shown in FIG. 4;

FIG. 8 shows one type of detailed organization of one word of the the data base shown in FIG. 7;

FIG. 9 shows an alternate type of detailed organization of one word of the data base shown in FIG. 7.

Figure 1:
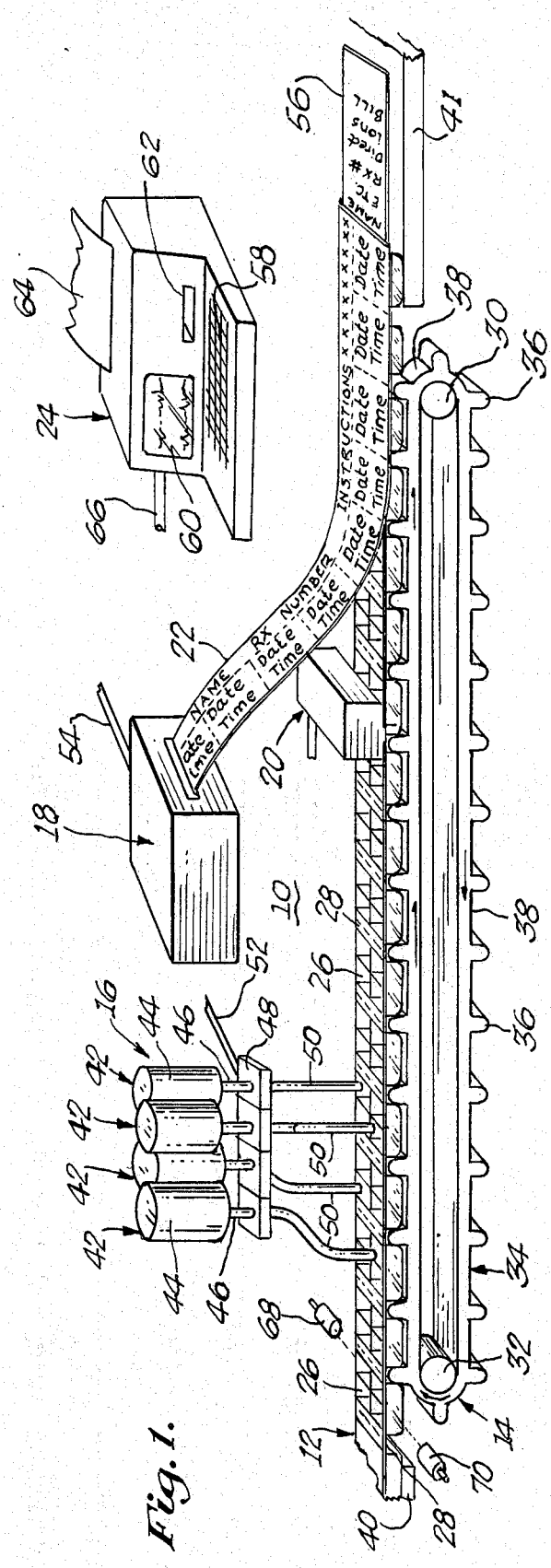
FIG. 1 shows the pill dispensing machine of the subject invention.

Referring now to FIG. 1, the pill dispensing machine 10 of the subject invention is shown. Machine 10 includes a container strip 12 moved by a conveyor mechanism 14. The container strip 12 is moved by conveyor 14 past a dispensing station 16 which is capable of dispensing up to four different type of pills into the containers 26 on container strip 12.

At the time dispensing station 16 is dispensing pills into the containers 26 of container strip 12, a label printer 18 is printing on the back of a backing 22 information relating to the time at which the pills in an associated container 26 of container strip 12 are to be taken. As the containers 26 of strip 12 are moved by conveyor mechanism 14, adhesive applying device 20 provides an adhesive over the top of strip 12 and the backing 22, containing the information printed by printer 18, is affixed to strip 12 to seal the container 26 therein. The conveyor mechanism 14, dispensing station 16 and label printer 18 are all under the control of a computer 24, which coordinates each so that the right pills are dispensed into the proper container and the proper printing on backing 22 is aligned over that container.

Container strip 12 includes a plurarlity of recessed containers 26 positioned adjacent to one another and equally spaced apart. A small space 28 is between each of the containers 26 and a perforation 74 is preformed in space 28. The detail arrangement of each of the containers 26 on strip 12 will be discussed hereafter with respect to FIG. 2.

Conveyor mechanism 14 includes a drive roller 30 and a free roller 32 for moving a conveyor belt 34 in the direction indicated by the arrows thereon. Drive roller 30 is connected to a motor, or other similar rotating mechanism, to move conveyor belt 34 in a continous loop fashion. Conveyor belt 34 may be molded of a hard rubber or flexible plastic material and includes a plurality of drive extensions 36 extending from the outer surface 38 thereof. Each of the extensions 36 is sized to fit in the space 28 between each of the containers 26 on the undersurface of strip 12. Further, each of the extensions 36 are spaced apart by the same amount as the space 28 distance between the container 26 of strip 12. Thus, as the undersurface of strip 12 is placed on the extensions of conveyor belt 34, strip 12 is moved along the path traveled by the upper half of conveyor belt 34. A support surface 40 may be positioned both before and after the position of conveyor belt 34 to provide a place for those portions of strip 12 to rest when not directly on conveyor belt 34. A support surface 41 may also be placed beneath the upper half of conveyor belt 34 to maintain that surface level.

Dispensing station 16 includes four identical dispensing units 42 for dispensing four different types of pills. Each of the dispensing units 42 includes a pill reservoir 44, a pill reservoir tube 46, a pill release mechanism 48 and a pill dispensing tube 50. Initially, the pill reservoirs 44 are filled with a particular type of pill prescribed by the physician. Included within reservoir 44 are mechanisms (not shown), well known in the art, for causing the pills to enter tube 46 one at a time. The pills are stopped by pill release mechanism 48 until such time as mechanism 48 receives a command over cable 52 from computer 24. Upon receipt of the command from computer 24, the commanded one of the pill release mechanisms 48 releases the pill, which then slides through tube 50 and into the container with which that tube 50 is aligned. Each of the four tubes 50 may be aligned with four different containers 26 along container strip 12 or more than one may be aligned with the same container 26. As shown in FIG. 1, each of the four tubes 50 are aligned with a different adjacent one of the containers 26.

Figure 3:
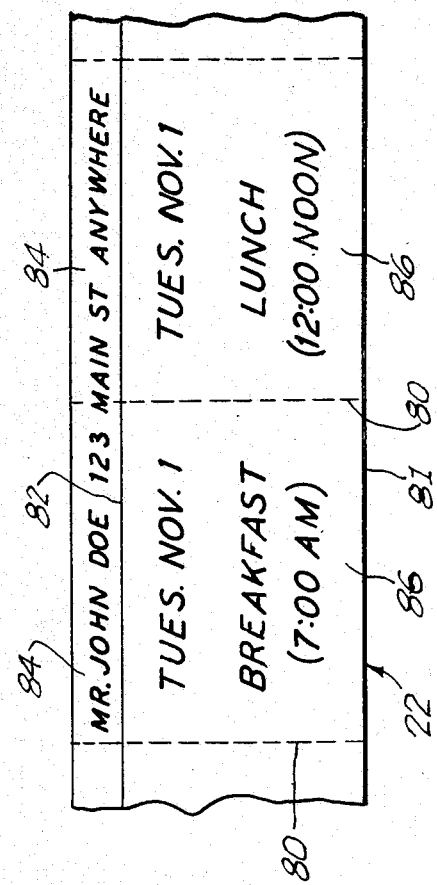
FIG. 3 shows the information printed on the label by the label printer shown in FIG. 1.

Printer 18 may be any type of conventional dot matrix printer or other printer which prints labels on the outward facing side of backing 22 in the manner shown in FIG. 3. Printer 18 is controlled by computer 24 applying signals over cable 54 thereto. The signals determine when and what is to be printed on each of the sections of backing 22. As backing 22 exits from printer 18, it is a continuous strip of paper having perforations 80 thereon defining various sections 86 thereof. These perforations 80 must be aligned between the containers 26 in the space 28 with perforations 74 of strip 12. In addition, each of the sections 86 must be aligned with a particular one of the containers 26 with which it is asociated, since information to be printed on each of the sections 86 of backing 22 is the time and date when the medication within the associated container 26 is to be taken. In addition, information with respect to the patient's name, address, phone number, doctor's name, prescription number and instructions should also be printed on the backing 22 in the manner described hereafter with respect to FIG. 3. As seen in FIG. 1, printer 18 is offset from the dispensing stations 16, so it may be necessary for the control signals supplied from computer 24 over cable 54 to printer 18 to be delayed compared to the initial signals controlling dispensing stations 42. This delay may be utilized to print a leader strip 56 on backing 22. Leader 56 may be, for example, the bill which the pharmacist can then give to the patient for payment, or it may contain other information such as the patient's name, presciption number, doctor and the like.

Backing 22, which exit from printer 18, is directed by conventional paper handling means (not shown) to be aligned with the moving container strip 12. Prior to the time that backing 22 come in contact with the top of strip 12, the adhesive applying device 20 will be covered the non-recessed surface on the top of strip 12 with an adhesive. The label, when contacting the adhesive, will immediately stick to the non-recessed surface of strip 12, thereby forming an closed container for the pills dispensed within the containers 26 of strip 12 at dispensing station 16. By proper alignment and delay, each of the preprinted sections 86 of label 22 are aligned with an associated one of containers 26 of strip 12 so that the information printed above that container 26 will manifest when the pills in that contaner 26 are to be taken.

Computer 24 maybe any conventional microprocessor controlled computer system adapted to provide the necessary signals described herein. Computer 24 includes a keyboard 58 and display screen 60. In addition, computer 24 may include a diskette drive 62 and an internal printer for printing on forms 64. The information printed on form 64 maybe any type of information which computer 24 may generate for the owner of pill dispensing machine 10. For example, computer 24 may store a list of the customers, their prescriptions, cost information, billing information, or other similar type information which computers typically are capable of generating.

Computer 24 controls each of the conveyor mechanism 14, dispensing station 16, label printer 18, and adhesive applying device 20 by providing signals thereto over cable 66. Computer 24 may also control certain safety devices, such as photodetectors 68 and 70, for insuring that the strip 12 has not become exhausted, or means within release mechanism 48 to insure a pill is properly positioned for being dispensed Referring now to FIG. 2, a more detailed view of strip 12 is shown positioned beneath one of the tubes 50. Strip 12 may be formed of injection molded plastic or other type of plastic material in which the containers 26 are may be formed. Each of the containers 26 may include a separator 72 which divides container 26 into a plurality of, for example, four different compartments 76. Separator 72 may be used in a situation in which four pill dispensing units 42 are utilized and it is desired that each of the different pills dispensed into container 26 be kept away from one another to avoid any reaction between them. Under other circumstances, it may not be necessary to include separator 72 within container 26. Thus, different types of preformed strips 12 may be utilized in the operation of pill dispensing machine 10.

Separating each of the containers 26 is perforation 74 in the plastic material of surface 28 of strip 12. Perforations 74 should be designed so one container 26 may be easily separated from the remainder of the containers of strip 12. Also, the container 76 is slightly removed from the edge of strip 12 to provide a slight flat surface 77 to which backing 22 may be affixed.

Figure 2:
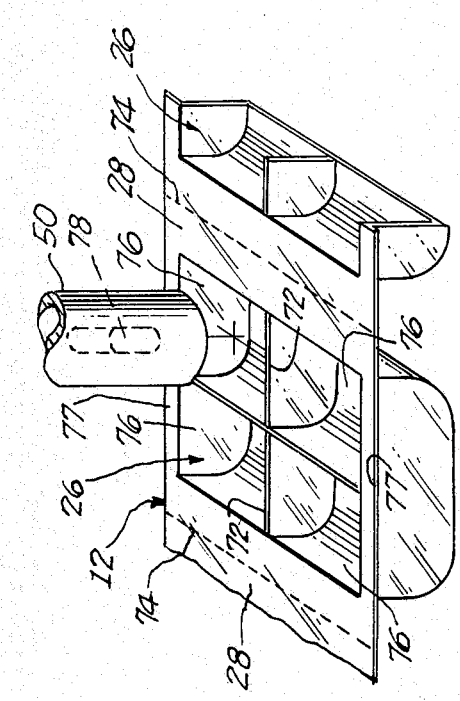
FIG. 2 shows an enlarged view of the pill containers being filled by the machine shown in FIG. 1.

As seen in FIG. 2, the tube 50 is aligned with container 26 slightly above the center of one of the compatrments 76 formed by divider 72. When a pill 78 within tube 50 is released by release mechanism 48, it falls through tube 50 and into one of the compartments 76. The divider 72, when utilized, will then keep pill 78 from contacting other pills which have been or will be dispensed into others of the compatrments 76 through others of the tube 50 shown in FIG. 1.

Referring now to FIG. 3, a more detailed view is shown of the facing side of backing 22, upon which is printed the date and time information. Perforations 80 are aligned with perforations 74 shown in FIG. 2 after backing 22 has been affixed to strip 12 as shown in FIG. 1. In addition, the lower edge 81 in FIG. 3 is aligned with one of the edges of strip 12 and line 82 is aligned with the other edge of strip 12. Thus, a portion 84 of backing 22 extends over the side of strip 12 and may be utilized to have printed thereon additional information which may be legally required, or otherwise useful to the customer of the pills contained in strip 12. However, the critical date and time information should be printed on section 86 between edge 81 and line 82. It should be noted that the time information may either be an exact time (e.g. 7:AM) or an event (e.g. Breakfast).

Figure 4:
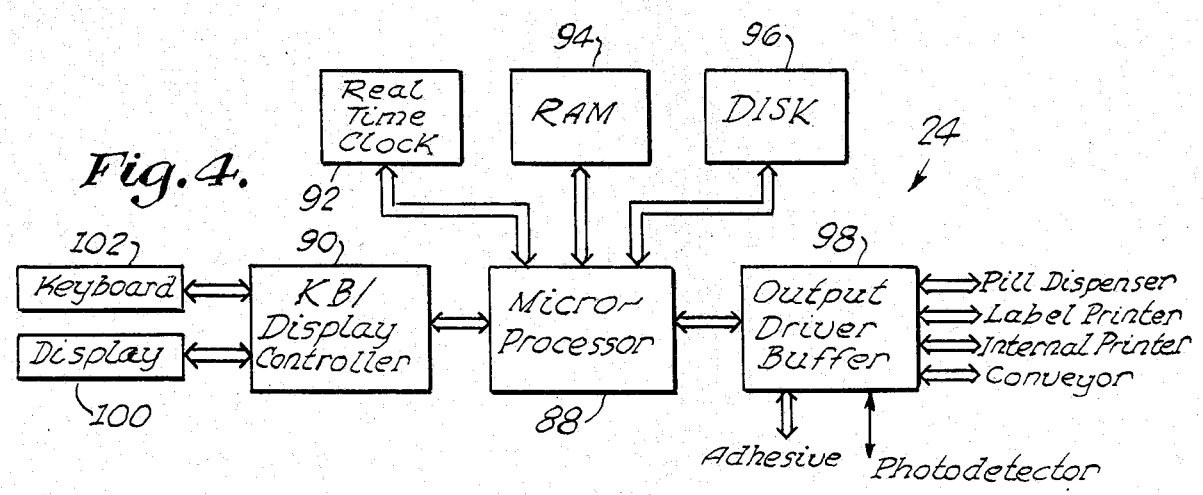
FIG. 4 shows a block diagram of the computer system controlling the pill dispensing machine shown in FIG. 1.

Referring now to FIG. 4, a block diagram of the various major components of computer 24 is shown. The heart of computer 24 is a microprocessor 88 which may be any conventional commercial microprocessor device, such as the Intel 8088 microprocessor manufactured and sold by the Intel Corporation of Santa Clara, Calif. Attached directly to microprocessor 88 is a keyboard display controller 90, a real time clock 82, random access memory (RAM) 94, a disk and associated disk controller 96, and output drivers and buffer 98. Each of these components are standard commercial components which are individually well known in the art. Attached to keyboard display controller 90 is the keyboard electronics 100 of keyboard 58 and display electronics 102 of display 60. In addition, a read only memory (not shown) may also be attached to or included with microprocessor 88 for storing the operating program, shown in block format in FIG. 5, for controlling microprocessor 88, to in turn, control system 10. Alternatively the operating program may be contained on disk 96 and transferred to RAM 94, if desired.

Figure 5:
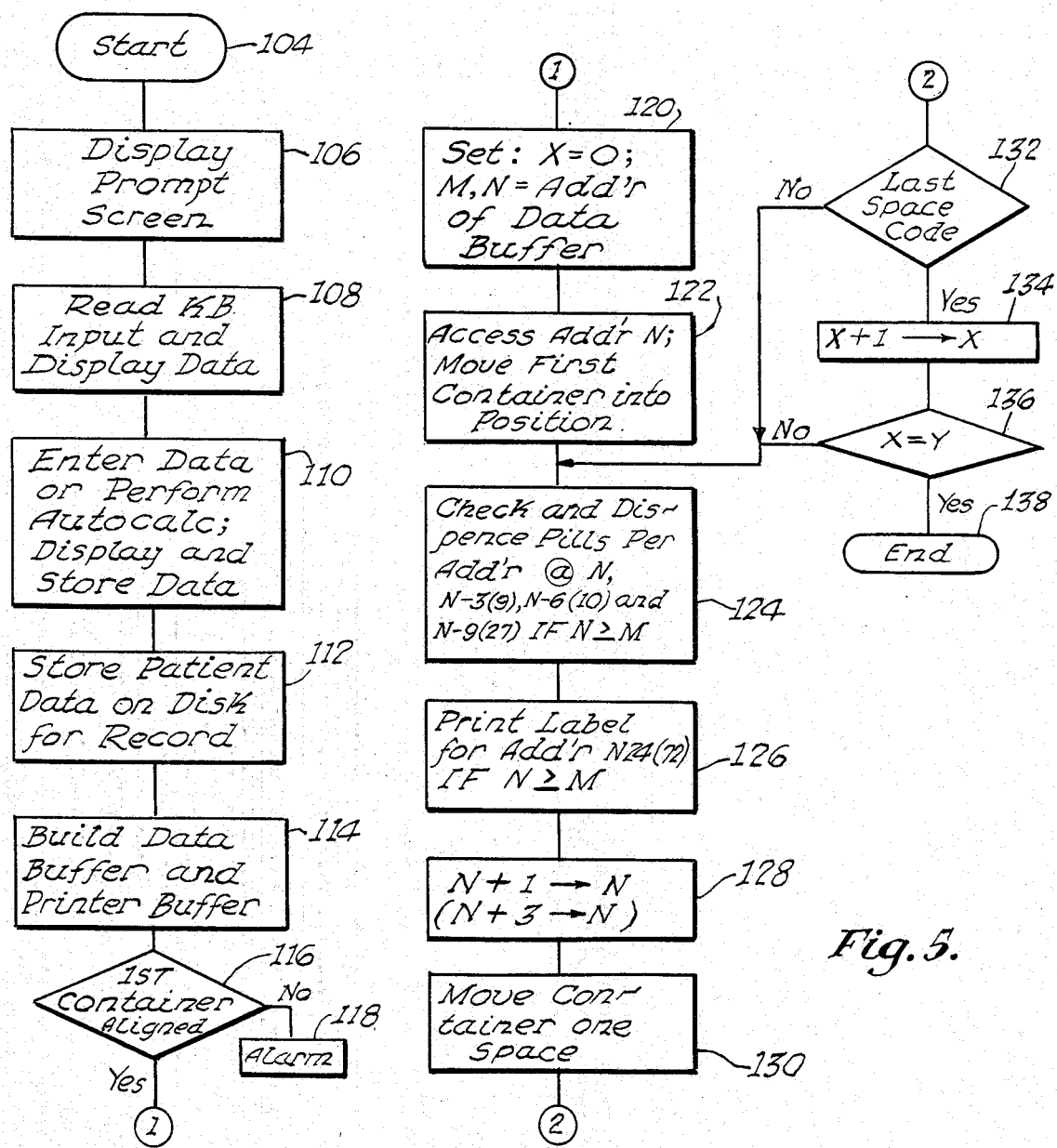
FIG. 5 shows a block diagram illustrating the operation of the computer shown in FIG. 4.

Referring now to FIG. 5 the manner in which microprocessor 88 controls each of the various components 90 thorough 102 (even numbers only) will now be described. The flow diagram in FIG. 5 consists of blocks 104 though 138 (even numbers only) and in explaining the functions performed by each of the blocks 104 through 138, reference will also be made to FIGS. 6 through 9.

First, as indicated in block 104, the operation program starts, typically by turning on the machine or by entering on keyboard 102 certain information to indicate that a new prescription is to be filled. Next, according to block 106, a prompt screen is caused to be displayed on display 102. This occurs by microprocessor 88 providing certain data through keyboard display controller 90 to display electronics 100, thereby causing a prompt screen 139 to be displayed on screen 60. The prompt screen 139 displayed is shown in FIG. 6 and includes a series of prompt messages 140 along the left side thereof. For example, the message today's date may be displayed and the operator is prompted to enter the date in the format of xx/yy/zz manifesting the month, day and year. Alternatively, the date may be automatically displayed by microprocessor 88 reading the date from real time clock 92. The prompted item to be entered may be illuminated by a blinking or reverse video cursor 141, thereby informing the operator what is requested. The initial requested information includes the name, address, phone number, and prescribing doctor of the customer.

The next message illuminated in AUTOCALC (Y/N). This indicates that the operator of system 10 is to decide whether to specify the data relating to the time the patient is to take the medication or whether to allow computer 24 to automatically calculate this information. By depressing the Y key on keyboard 58, the calculation is performed by computer 24 and by pressing the N key on keyboard 100, the pharmacist will be prompted to enter in the data manifesting the times the medication is to be taken. Next, the start date and start time of the treatment are prompted and the requested data is entered. Typically that will be the same day or the next day and the same time or the next given even thereafter.

Next, the prompt screen messages 140 require the first, of up to four different, prescriptions be entered by prescription number, medicines name, which may be a coded number or an alphanumeric name, and, in the event that a manual calculation of the times has been selected, the time that the medicine is to be taken. If AUTOCALC had been answered (Y), the computer would calculate the times that the medication named in the preceeding prompt message is to be taken and display it for the pharmacists to check. Identical information is repeated for each of the medications to be taken. If less than four medications are prescribed, then no information can be entered for the unnecessary medications.

Referring again to FIG. 5, block 108 indicates that the data entered in on keyboard 100 is read and displayed on display 102. Then, according to block 110, this data is stored and, if selected, the AUTOCALC calculation is performed and that data is displayed and stored. Then, according to block 112, the patient data and other selected pertinent data may be stored on disk unit 96 for a permanent recorder for the seller of the medication being dispensed by machine 10.

Next, according to block 114, the data buffer and printer buffers are built. The data buffer will appear as the data base 144 shown in FIG. 7 and will include a series of adjacent program addressable words, of one or more bytes each, manifesting the manner in which the medication is to be dispensed. As seen in FIG. 7, the first word of the data base 144 contains the information relating to the pills to be dispensed in the first container 26, first compartment 76 thereof. The next word contains the first container, second compartment information and so on until the last word would contain the last container, fourth compartment information. This information may simply be either a dispense or not dispense entry for each container executable when that container is aligned with a particular one of the dispensing tubes 50 shown in FIG. 1.

To additionally use the data base 144 for building the print buffer, data base 144 must contain time information for each container 26. FIG. 8 shows one type of data word 146 which may be used to contain the required data of data base 144. The word 146 is one byte (8 bits) long and may generally be used whenthe AUTOCALC function is selected to specify the time for taking the medication at one or more of either breakfast, lunch, dinner or bedtime. A "1" bit may be placed in one of the first four bit positions of each word 146 to respectively manifest either breakfast, lunch, dinner or bedtime. The last four bits either won't be used or will be used to manifest other information.

Alternatively, a higher resolution word 148, as shown in FIG. 9, may be used where a manual entry is to be made in response to the medicine time prompts shown in FIG. 6. In word 148, three bytes of data, containing 24 bits, are shown. Each of the 24 bits may be synanomous with one hour of a particular 24 hour day and a "1" bit is placed in that slot for that particular hour. For example, if a "1" bit is placed in the eighth bit position it would manifest 8:00 A.M. An additional byte 150 may be attached to manifest an offset such as 0,15,30, or 45 minutes past the hour.

The print buffer is built using the data in data base 144 and consists of a matrix of data, manifesting the dot pattern of the data to be printed. Building such a print buffer is well known in the art and may utilize a character generator stored in the memory or other similar techniques. Alternatively, microprocessor 68 may offload conventional ASCII data to a microprocessor associated with label printer 18 and the print buffer may be built within printer 18 and only controlled by computer 88 by turning printer 18 on and off, or issuing instructions as to when to begin the printing.

Referring again to FIG. 5, next, according to block 116, a determination is made whether the first containers has been aligned. This may be done by computer 88 reading the data supplied from photodetectors 68 and 70 shown in FIG. 1. This information may be read by appropriate signal being applied from microprocessor 88 to output buffer/driver 98 to cause the signals from the photo detector circuits to be read.

If it is determined at blocks 116 that the first container has not been aligned, then an alarm or other prompting message may be displayed, as indicated by block 118. If it is determined at block 116 that the first container is properly aligned, then a continuation at block 120 occurs, where certain values are set. For example, the value X is set equal to 0 and the values M and N are set equal to the address of the first byte of data in the data base 144. Then, according to block 122, the data base 144 address manifested by the variable N is accessed and the containers are moved so that the first container is in alignment with the first of the tubes 50.

Next, according to block 124, checks are made to insure that pills are properly positioned within the release mechanisms 48 and then the pills are dispensed according to the data in the addresses N, N-3, N-6 and N-9 if those addresses are within the data base 144, which begins at address M. Thus, when the first container 26 is aligned with the first tube 50, only address offset 0 would be within the data base 144 addresses and only the instructions of address offset 0 will be followed. However, as additional containers 26 are moved past the first tube 50, subsequent ones of the N-3, N-6 and N-9 addresses will become within the data buffer 144. For example, when the first container is aligned with the fourth tube 50, then addresses 12,9,6 and 3 of data base 144 will be used.

In block 124 the locations N, N-3, N-6 and N-9 are utilized where the AUTOCALC feature has been selected and the single byte data words, as shown in FIG. 8, is utilized. If a three byte data word, such as shown FIG. 9 is utilized then the locations to be addressed would be three times those previously indicated. These locations are shown in the parenthesis in FIGS. 7 and in block 124, 126 and 128. If a four byte word, such as shown by the additional dashed lines 150 in FIG. 9 then the locations to be addressed would be four times those previously indicated. Again it is necessary that each of these locations be within the address of data base 144, whose address beings at the constant M.

Next, according to block 126, at the appropriate time computer 88 issues a command through output/ buffer driver 98 to the label printer to cause the label information to be printed. As shown in FIG. 1, there is a six container delay and thus the data provided to label printer 18 would be delayed by the time required to move the first container six time. This time, however, could be utilized in printing the header 56.

Next, according to block 128, the variable N is incremented by one for the AUTOCALC or by three for the manual time selection. Then, according to block 130, the containers are moved one space; this may be controlled from by computer 88 monitoring output from photodetector 68 and 70 and controlling the time drive roller 30 is rotated.

Then, according to block 132, a determination is made whether the last space code is found in the data base 144. The last space code may be a special code in the location immediately after the last location of real data in the data base 144. If the last space code is not determined, then a return from block 132 to block 124 is indicated and blocks 124,126,128,130 and 132 are repeated until such time as the last space code is found.

Once the last space code is found at block 132, then according to block 134, the variable X is incremented by one and a determination is made at block 136 whether X is equal to four. This allows the last four containers aligned with the four tubes 50 to be completely filled. If at block 136, it is determined X is not equal to four, a return to location 124 occurs and blocks 124 through 136 are repeated until X is equal to four.

At this point in time each of the containers 26 will have been filled with at least one pill and the program ends, as indicated by block 138. During the end routine, it will be necessary to provide instructions to move the containers additional spaces until all of the labels can be printed, attached to strip 12 and the containers exit onto table 40.

What is claimed is:

1. A medication dispensing machine for dispensing, into a single container, a plurality of different medications to be simultaneously taken, said machine comprising:

means for moving a plurality of containers along a path;

a plurality of medication dispensing devices, each positioned to dispense at least one medication into a container as said plurality of containers move past said plurality of dispensing devices;

printing means for printing a series of labels, each of which is to be attached to one associated container, the printed matter on each label manifesting the time at which the medication in the associated container is to be taken; and controller means, including data input means, memory means for storing a data base and output means, said data input means being adapted for receiving input data manifesting medication to be taken and the time at which that medication is to be taken, and said output means providing, in response to said data base, command signals to control said means.

2. The invention according to claim 1 wherein said data base includes:

data manifesting which of the dispensing devices are to be operated after said means for moving has moved said containers; and data manifesting the information to be printed on each label.

3. The invention according to claim 1 wherein said containers are formed in a plastic strip having perforations spaced along the length of said strip, there being a container formed in said strip between adjacent perforations.

4. The invention according to claim 3 wherein each of said medication dispensers dispenses medication into one of said containers.

5. The invention according to claim 4 wherein each of said medication dispensers is aligned with a different container of said strip.

6. The invention according to claim 1 wherein said controller means includes digital computer means having coupled thereto a keyboard input means through which said input data is entered, said computer means building said data base by storing, in said memory means, data defining the medication to be dispensed into each of said containers.

7. The invention according to claim 6 wherein said computer means further builds a second data base for controlling said printing means, said second data base manifesting the information to be printed on each label, and said second data base being built in response to the data stored in said first mentioned data base.

8. The invention according to claim 6 wherein said computer means provides control signals to said dispensing means in accordance with the data stored in said data base.

9. The invention according to claim 8 wherein said computer means further builds a second data base for controlling said printing means, said second data base manifesting the information to be printed on each label, and said second data base being built in response to the data stored in said first mentioned data base.

10. The invention according to claim 9 wherein said data base includes:

data manifesting which of the dispensing devices are to be operated after said means for moving has moved said containers; and data manifesting the information to be printed on each label.

11. The invention according to claim 10: wherein said containers are a preformed plastic strip having perforations spaced along the length of said strip, there being a cup preformed in said strip between adjacent perforations.

12. The invention according to claim 11 wherein each of said medication dispenser dispenses medication into one of said cups.

13. The invention according to claim 12 wherein each of said medication dispensers is aligned with a different cup on said strip.

14. A medication packaging machine for selectively dispensing a plurality of different pills into containers in such a manner that all of the pills in a given container are to be taken at the same time, said system comprising:

digital processor means for receiving and storing data manifesting each of the pills and the frequency each is to be taken;

a plurality of pill containers, adjacently coupled to one another:

means for moving said plurality of containers along a given path;

a plurality of dispensing means, each positioned to selectively dispense a different one of said plurality of pills into each container as said container is moved along said path;

said digital processor means being coupled to control said means for moving and the selective dispensing by said dispensing means in accordance with the data received thereby; and means, responsive to said processor means, for providing a label for each of said containers having printed thereon the date and time the pills in the container are to be taken.

15. The invention according to claim 14 wherein said system further includes means for affixing each label over the opening in the container for which it is provided, said means for providing said label being controlled by said processor means.

16. The invention according to claim 15 wherein said processor means includes display means for directing the input of said data.

17. The invention according to claim 14 wherein each of said containers includes a plurality of compartments each adapted to receive a different pill, each of said means for dispensing being aligned with a different one of said compartments.

18. The invention according to claim 14 wherein said containers are formed in a plastic strip, there being a perforation separating each formed container.

19. The invention according to claim 18 wherein said system further includes means for affixing each label over the opening of the container for which it is provided, said means for providing said label being controlled by said processor means.

20. The invention according to claim 19 wherein said processor means includes display means for directing the input of said data.

* * * * *